United States Patent

[11] 3,579,215

[72] Inventor Denis R. Brasket
 3313 Croft Drive, St. Anthony Village, Minn. 55414
[21] Appl. No. 581,858
[22] Filed Sept. 26, 1966
[45] Patented May 18, 1971

[54] METHOD AND APPARATUS FOR CONDUCTING A SIGNAL
 6 Claims, 6 Drawing Figs.
[52] U.S. Cl. .................................................. 340/198, 244/123
[51] Int. Cl. .................................................. G08c 19/48
[50] Field of Search ........................................... 340/198

[56] References Cited
UNITED STATES PATENTS

| | | | |
|---|---|---|---|
| 2,874,375 | 2/1959 | Elwell | 340/198 |
| 2,983,908 | 5/1961 | Hartman | 340/198 |
| 3,035,214 | 5/1962 | Kelling | 340/198 |

*Primary Examiner*—Thomas B. Habecker
*Attorney*—Williamson, Palmatier & Bains

ABSTRACT: A cablelike device designated as a vector conduit comprised of a plurality of rigid sections coupled together at articulating joints permitting relative angular movement therebetween is utilized to transmit a directional signal from a signal generator on a first space platform, such as an aircraft fuselage, to a signal receiver located on a second space platform which is not rigidly connected to the first platform, such as a wing tip of the aircraft. A mechanical device, such as a rocket launcher, on the aircraft wing tip is oriented on the desired directional path by the signal receiver in response to a signal transmitted through the vector conduit from a sighting device on the first space platform. An electromechanical device operatively associated with each of the articulating joints in the vector conduit is utilized to measure or sense the angular displacement between the rigid sections of the vector conduit and to make a corresponding correction in the directional signal, thereby compensating for angular deviation between the first and second space platforms to insure that the signal receiver properly positions and orients the mechanical device, i.e., the rocket launcher, in the desired directional path.

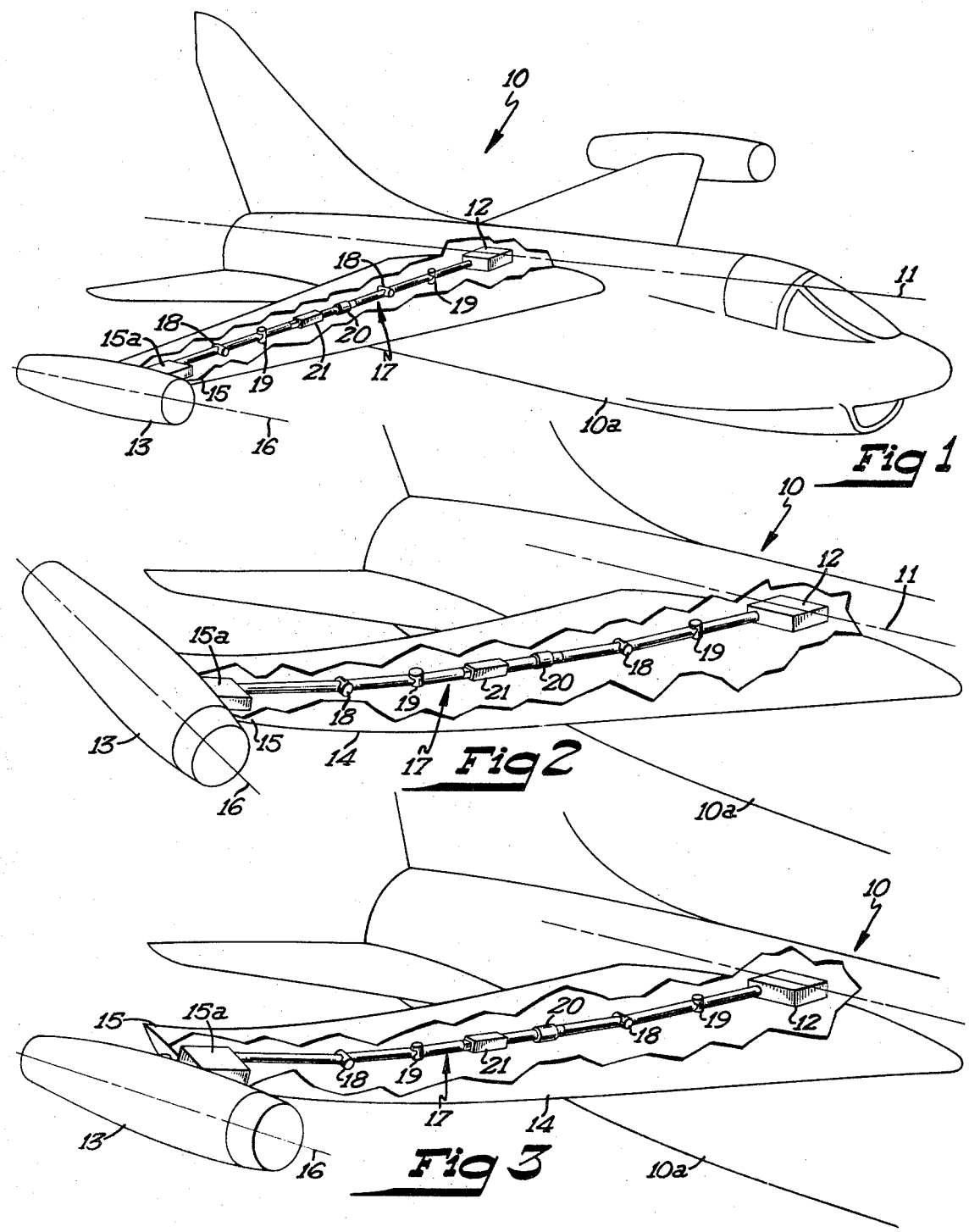

INVENTOR.
DENIS R. BRASKET

BY
Williamson, Palmatier
& Bains   ATTORNEYS 3,579,215

METHOD AND APPARATUS FOR CONDUCTING A SIGNAL

This invention relates to a method and apparatus for conducting a signal and, more particularly, relates to a method and apparatus for conducting a signal between a first space platform and an alternate space platform which is not rigidly connected to the first platform.

It is oftentimes desirable to position a remote object from a first location, the remote object at the second location being inaccessible and not adapted to be rigidly connected to the first location. For example, it may be desirable to angularly position a search light or closed circuit television camera in a mine shaft from first location outside of the mine shaft. Further, it is not enough that the search light or television camera be positioned but it must be known that the light or camera is positioned with a specific angular relation relative to the positioning means at the first location. Another example would be aiming a gun with the gun sight on one ship and the gun on another ship. Each ship is floating separately and, therefore, compensation must be made for the movement of the second ship which is independent of the first ship on which the gunsight is located. Directional radar mounted on the first ship can produce a signal which may be conducted to the second ship to align a gun on the second ship. However, since the ships are not rigidly attached, compensation is not made for the independent movement between the ships and, therefore the gunsight radar and the gun on the first and second ships respectively are not compensated for the separate motion of the ships.

Without unduly limiting this invention, a specific application regarding the use of my invention will be discussed relative to its use in an aircraft. Typically, the sighting means such as radar and a computer is mounted at the fuselage, or first space platform, of the aircraft. However, the guns or rockets are typically attached at the wingtips or on the wing of the aircraft, the alternate or second space platform. The wing flexes relative to the fuselage and, therefore, the gun or rockets flex with the wing. The sighting means to which the gun or rocket responds does not compensate for fluctuation which takes place on the wing. The wing fluctuation is unknown quantity which cannot be corrected by the computer on the first space platform on the fuselage. Therefore, the direction which a wing mounted rocket takes in response to aiming means at the fuselage is not compensated for wing flexing.

With these comments in mind it is to the elimination of these and other disadvantages to which the present invention is directed, along with the inclusion therein of other novel and desirable features.

An object of my invention is to provide a new and improved method and apparatus of simple and inexpensive construction and operation for conducting a signal from one space platform to a second space platform.

Another object of my invention is to provide a novel method and apparatus for conducting signals which will compensate for all combinations of angular movement between first and second space platforms.

Still another object of my invention is the provision of conducting means which does not require the use of cumbersome and highly complicated inertial references, sensors or gyro mechanism to carry out compensation between the predetermined space platforms.

A further object of my method and apparatus is the provision of a device which may be readily adapted to use on existing equipment.

These and other objects and advantages of my invention will more fully appear from the following description made in connection with the accompanying drawings wherein like reference characters refer to the same or similar parts throughout the several views and in which:

FIG. 1 is a diagrammatic sketch showing a typical usage of the method and apparatus of my invention;

FIG. 2 is an enlarged partial diagrammatic view showing a selected position between the space platform;

FIG. 3 is an enlarged diagrammatic view showing the correction at the second space platform utilizing the method and apparatus of my invention;

Figure 4:
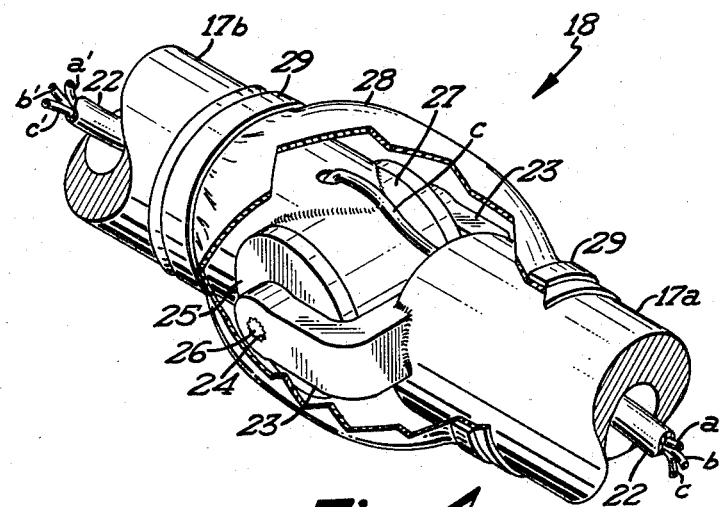
FIG. 4 is an enlarged partial perspective view of a pitch or yaw joint of my invention with portions broken away for clarity.

One form of the present invention is shown in the drawings and is described herein.

FIG. 1 shows an aircraft 10 having a fuselage 10a which may be considered the first space platform. A longitudinal axis denoted by 11 is shown at the fuselage. For purposes of explanation, the axis 11 passes through a signal generating means 12 which may receive a signal from radar or the like and includes a computer for transmitting a predetermined signal in response to the radar. The signal from the signal generating means aims a rocket or gun mounted on a second space platform. As shown in FIG. 1, a rocket pod 13 is mounted on the wing 14 of the aircraft 10. Wingtip 15 constitutes the second or alternate space platform and the rocket pod 13 is joined to the wing and is adapted to respond to the signal generated by the signal generating means 12 on the first space platform at the fuselage. Signal receiving means 15a receives the signal aiming the rockets in response to radar at the first space platform. AT rest, the rocket pod 13 is aligned along the longitudinal axis 16 which is substantially parallel with longitudinal axis 11 of the fuselage 10a. However, under stress, as shown in FIG. 2, the wing will deflect thereby taking the rocket pod 13 out of alignment relative to the fuselage. Therefore the signal transmitted from generating means 12 to receiving means 15a will position the rockets on the wing in response to radar on the fuselage but will not correct for relative movement between the space platforms.

In order to return the rocket pod 13 into alignment, as shown in FIG. 3, with the rocket pod axis in line with the fuselage axis, a vector conduit 17 is utilized to join the generating means 12 with the receiving means 15a. In order to properly aim the rockets in the rocket pod 13 mounted on the wingtips or alternate space platform 15 from an aiming device which is typically mounted on the fuselage or first space platform 10a, compensation must be made for angular deflection of the wing on which the rocket pod is mounted. Without means for maintaining alignment between the remotely positioned first and second platforms, the rockets would be considerably off target when mounted on a wing and aimed from the fuselage. Any angular misalignment between the aiming platform and the firing platform contributes to the miss which results when the rocket it fired; the magnitude of the miss contribution being a product of the angular misalignment and the range to target.

Vector conduit 17 joins the signal generating means 12 which is mounted on the fuselage or first space platform 10a with a signal receiving means 15a which is mounted on the alternate or second space platform or wingtip 15. The vector conduit conducts the signal and compensates for any movement between the respective space platforms thereby conducting the positioning signal from generating means 12 and orienting the signal receiving means on alternate space platform 15a to correspond to the orientation of the signal generating means irrespective of uncontrolled or unmeasured motion between the platforms which are not rigidly connected. The orientation of the signal receiving means may be accomplished by an arrangement of servomechanisms and gimbals which respond to the compensated signal. Since the connection of the signal to the servomechanisms is well known, it will not be discussed here. The servomechanisms and gimbals are commercially available. The vector conduit comprises a plurality of rigid section joined at selected intervals by pitch joints indicated at 18, yaw joints indicated at 19, roll joints indicated at 20 and telescoping joints indicated at 21. Of course, any combination of these joints may be used and the spacing may be as desired. Since it is imperative that the rigid conduit between the joints does not bend thereby introducing random, uncompensated errors into the vector conduit, additional joints as appropriate may be utilized to decrease the stress on the conduit.

Referring to FIG. 4, a detail of the pitch joint is shown. (The yaw joint is the same as the pitch joint except that it is rotated 90° in the vector conduit.) The pitch joint is constructed in such a way that the incoming signals or vector quantities are resolved dependent upon the angle through which the incoming and outgoing conduit sections 17a and 17b respectively must rotate to compensate for pitch deflection due to stress on the conduit or movement between the space platforms. The joints is constructed from incoming conduit or rigid section 17a which contains wire 22 which carries the predetermined signals. The position determined at the signal generating means may be considered a vector with the vector direction determined by, for example, the gunsight. Connection of the gunsight and computer to the signal generating means is well known in the art. The signals which are transmitted correspond to the direction cosines of the vector considering the x, y and z coordinates of a standard rectangular coordinate system. Each signal is typically a voltage differential. The incoming signals, or direction cosines, are denoted by a, b and c in wire 22.

Conduit or rigid section 17a includes a pair of arms 23 which are affixed to one end of conduit or rigid section 17a as by welding, and each of which arms have openings 24 to receive a resolver 25 mounted at resolver shaft or axis 26 for rotation about a transverse, generally horizontal centerline. The signals are wired into the resolver in the conventional manner. It should be noted that the yaw joint has a generally upright centerline of rotation. The housing of the resolver is denoted by 27 and is affixed to outgoing conduit 17b as by welding. The conduit joint may be enclosed in a flexible housing 28 such as Mylar film which is broken away for clarity. Housing 28 protects the resolver joint and is attached to the incoming and outgoing section 17a and 17b respectively by the rings connections 29 which are commercially available tempered rings having an inner diameter approximating the outer diameter of the incoming and outgoing conduit sections.

The resolver is commercially available from, for example, American Electronics, Inc., Fullerton, California, and is modified to include a heavy shaft 26 which passes through the resolver to accept the pair of arms 23 on each side of the resolver housing. The resolver is a rotatable electromagnetic device which accepts two input signals such as voltages. The output voltages are equal to the input voltages at one shaft position. For other shaft positions the output voltages are related to the input voltages, and to the angle determined by the shaft rotation from the null position by trigonometric resolution. Since incoming section 17a is attached to the shaft 26, and outgoing section 17b is attached to the housing, the rotation about shaft 26 will be measured by the resolver and a corresponding correction made in the incoming signal to correct for any plus or minus rotation of the sections about the shaft 26. The resolver may be compared to a transformer. The resolver stator is excited with an alternating voltage. The resolver rotator is magnetically coupled to the stator, however, the rotator may be positioned with respect to the stator, varying with shaft rotation. Therefore, the movement of the shaft will be measured by the resolver. Considerable detail on resolvers may be obtained from Bulletin 1 RDA-9, available from the American Electronics, Inc., Fullerton, California. Resolver 25 is typically a four winding resolver which will receive direction cosines in a two dimensional plane and resolve the quantities dependent upon the angle through which the incoming and outgoing sections must rotate to absorb any deflection due to movement between the signal generating means and the signal receiving means. Therefore, the outgoing signals, which are denoted in FIG. 4 within wire 22 as $a'$, $b'$ and $c'$ are resolved and therefore corrected for the angular deflection. Of course, the deflection is only measured in a two dimensional plane. Therefore one of the signals bipasses the resolver and is indicated in the drawing at $c$.

Assuming, in order to absorb a predetermined deflection at a pitch joint, that the incoming rod must rotate about an angle $\Phi$, the mathematical expression of the correction is as follows:

$a'=a \cos \Phi + b \sin \Phi$
$b'=b \cos \Phi - a \sin \Phi$
$c'=c$

Considering the yaw joint the correction is:

$a'=a \cos \Phi - c \sin \Phi$
$b'=b$
$c'=c \cos \Phi + a \sin \Phi$

Figure 5:
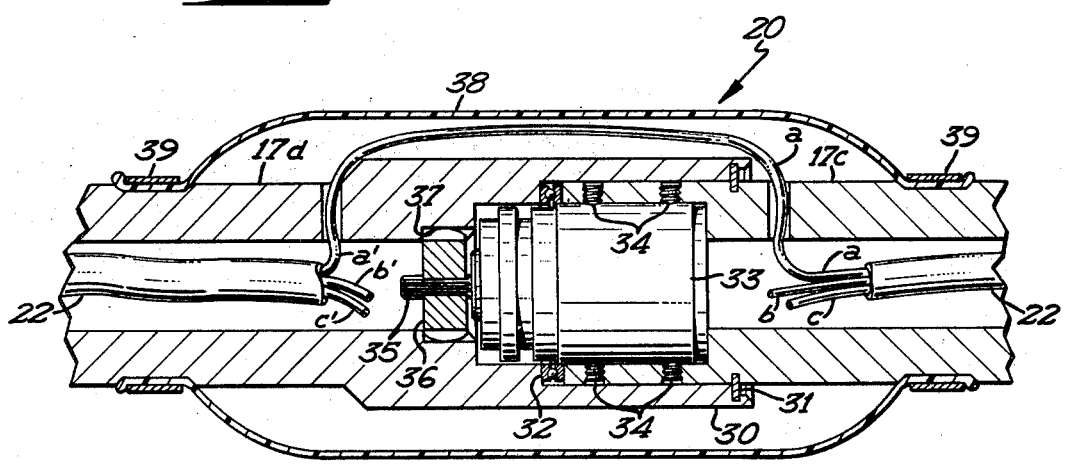
FIG. 5 is a longitudinal sectional view of a roll joint of my invention.

In the above manner compensation may be made for pitch deflection and for yaw deflection, correcting the signal transmitted by the signal generating means 12 to the signal receiving means 15a irrespective of any movement corresponding to pitch or yaw joints between the space platforms on which the generating and receiving means 12 and 15a respectively are mounted. However, a roll movement may also be realized between the space platforms. To compensate for the roll movement, a roll joint as shown in FIG. 5 may be included in the vector conduit. The roll joint is similar to the pitch and yaw joints in that a resolver is used and the mathematical expression of the correction is somewhat similar.

FIG. 5 shows incoming conduit section 17c which is adapted to rotate within outgoing conduit 17d. The incoming conduit 17c is inserted within an extended sleeve portion 30 of the outgoing conduit 17d which has an internal diameter approximating the outer diameter of conduit 17c such that the incoming conduit may rotate within the extended sleeve portion 30 of the outgoing conduit. Bearings 31 and 32 are provided to support and retain the incoming conduit 17c within the extended sleeve portion 30 and allow free rotation therebetween. A resolver 33 is shown having its axis of rotation aligned along the longitudinal axis of the incoming and outgoing sections 17c and 17d respectively. The housing of resolver 33 is securely attached to incoming conduit section 17c as by set screws 34. The shaft 35 of resolver 33 is a spline shaft which is received by mating gear member 36 which has an internal spline adapted to receive the spline shaft 35. Gear member 36 mates with mating opening 37 which is within the extended sleeve portion 30 of outgoing conduit section 17d thereby securely attaching the shaft to the outgoing conduit section 17d. Wire 22 is shown with the signals $a$, $b$ and $c$ contained therein. The signals are connected to the resolver 33 at the terminal board thereof in a conventional manner which is not shown. Since the motion to be resolved is not pertinent to signal $a$, signal $a$ bypasses the resolver. The mathematical expression of the correction at the roll joint is as follows:

$a'=a$
$b'=b \cos \Phi + c \sin \Phi$
$c'=c \cos \Phi - b \sin \Phi$

A flexible housing 28 surrounds the joint to protect the resolver, and tempered bands 39 secure the flexible housing 38 to the incoming and outgoing conduit sections. It should be noted that sufficient flexible, plastic housing material 38 must be included to compensate for the rotation between the incoming and outgoing joints.

Figure 6:
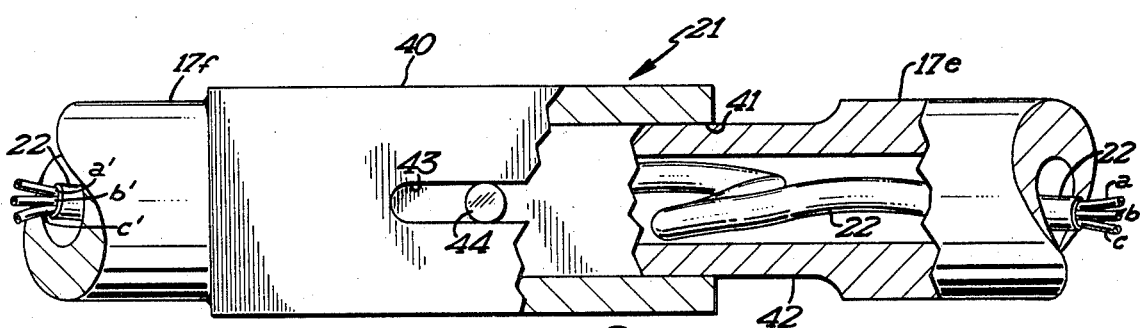
FIG. 6 is a perspective view of a telescoping joint of my invention with portions broken away for clarity.

It is anticipated, from time to time, that the vector conduit will experience longitudinal stress between the conduit sections which will require an extensible, or telescoping joint. Since the orientation of the respective space platforms may be compensated by the above mentioned pitch, yaw, and roll joints, the purpose of the extensible or telescoping joint is a protective measure to prevent undue stress on the vector conduit. The telescoping joint is shown in FIG. 6, denoted by numeral 21 and includes an incoming section 17e and an outgoing section 17f having an extended sleeve portion 40 adapted to receive the incoming section 17d. The extended sleeve portion has a square opening 41 and the forward portion of the incoming section has a mating square outer periphery 42 adapted to be received into the square opening 41 on the outgoing shaft. This is to prevent any rotational movement which is not compensated by a resolver. Wire 22 is shown disposed in the incoming and outgoing conduit sections. A slot 43 is provided in the extended sleeve portion 40 of outgoing conduit 17f. A corresponding stop or peg 44 is attached to the square portion 42 of the incoming conduit 17e through slot 43 to prevent pulling apart of the respective conduit sections under stress. The stop or peg 44 may comprise simply a bolt which passes through slot 43 and is threaded into the square portion 42. The mathematical expression at the telescoping joint may be expressed as follows:

$a'=a$
$b'=b$
$c'=c$

It should be noted that any combination of the above joints may be used and, further, that not all of the joints are necessary for a given installation. In that it is important that bending does not occur in the vector conduit sections, the required length of the rod sections depends upon the structural strength of the section and the degree of stress which the sections will experience dependent upon their installation means. As the stresses anticipated on the conduit increase, the rod length should be shortened and the rod strengthened. Of course, the articulated joints alleviate the bending stresses on the vector conduit and therefore substantially prevent deformation of the sections. Even so, improper installation may introduce bends in the sections and thus error, for example, when spanning too great a distance with sections which are too light.

In operation, my vector conduit may be utilized to join any type of signal generating means mounted on a space platform, which signal generating means is capable of transmitting direction cosines or other vector quantities which determine the position of a vector. The vector may correspond to a manually sighted aiming means, radar sighted aiming means, a manually positioned television camera or any of several other directional devices. The vector conduit is joined to signal generating means, on which the directional device is mounted, in a standard well-known way. Voltage differentials are conducted in the vector conduit as determined by the signal generating means. The vector conduit is then attached at the other end, to the signal receiving means which may have a gun mounted thereon which is aimed or a television screen mounted thereon which must be oriented relative to the position of the camera at the first platform. The vector conduit is attached to the signal receiving means which includes suitable servomechanisms and gimbals to receive the corrected signal from the conduit and orient the signal generating means or device thereon to correspond with the orientation of the device on the signal generating means.

The signal transmitted or conducted through the vector conduit is compensated at each pitch joint for pitch stresses by utilizing the resolver, or equivalent means, which hingedly joins the rigid vector conduit sections and measures the deflections. In a similar manner, the yaw stresses are compensated at the yaw joints. The yaw joints, of course, are rotated at 90° to the pitch joints and are otherwise the same, except that compensation is made for different directional cosines. The roll joint compensates for rotational movement along the longitudinal axis of two in line abutting vector conduit sections which are rigidly connected for rotation about the longitudinal axis which rotation is measured by a resolver affixed therebetween. Therefor, the directional cosines which correspond to the standard rectangular coordinate system and which are transmitted by the signal generating means on the first space platform are corrected for each deviation between space platforms thereby correcting the transmitted signal resulting in a corrected signal at the signal receiving means. The signal receiving means responds to the corrected signal and the positioning servomechanisms and gimbals orient the signal generating means or device thereon to correspond to the orientation of the signal generating means or device thereon.

From the foregoing it will be seen that I have provided an efficient means for connecting any two or more independent space platforms and orienting signal generating and receiving means mounted on separate space platforms in a predetermined relative position irrespective of the relative angular movement between the space platforms. In a manner of speaking, I have provided means for urging receiving means mounted on a second space platform to behave as though it were rigidly connected to a first space platform. My device may be used to connect a series of alternate space platforms with a first space platform and to orient the alternate space platforms in any predetermined position relative to the first space platform regardless of independent movement. For example, the second or alternate space platform may be oriented at 90° to 180° out of phase with the first space platform with a simple change in the wiring. The vector conduit is extremely simple in design and does not require the use of inertial references, sensors, or gyro mechanisms to compensate for movement between platforms. In fact, the vector conduit is of cablelike nature such that it may be stored in compact, "rolled" position. The device may be unrolled to connect the signal generating means with the signal receiving means which are typically readily available, standard items. The connection may be made in a very simple manner to connect presently existing platforms with heretofore unavailable accuracy. Of particular note is the ease with which my vector conduit may connect the gunsight means at the fuselage of an existing aircraft with the armament positioned at the wingtips of the aircraft. The vector conduit may simply be "threaded" through the inner portion of the wing of the aircraft and connected to the rocket pod through available servomechanisms and gimbals which would position the rocket pod.

My vector conduit compensates for angular misalignment between first and second space platforms as described above. It does not, however, compensate for changes in distance between respective platforms. In the example above concerning the aircraft, distance changes between the space platform are minimal and may be disregarded. However, considering the example in which sighting means are on one ship at sea and a rocket is on another ship, my vector conduit will align the sighting means with the rocket irrespective of the independent "bobbing" of the ships at sea. However, if the ships drift apart, the rocket may miss the target by the amount that the ships drift apart. This drift may be measured, as could any distance change between any space platforms and the distance fed into a computer which could then cause a corrected signal to be transmitted through my vector conduit such that the rocket is realigned to correct for the translational movement between the ships.

I will, of course, be understood that various changes may be made in the form, details, arrangement and proportions of the various parts without departing from the scope of my invention.

I claim:

1. A vector conduit adapted to conduct a directional signal from signal generating means mounted on a first space platform to signal receiving means mounted on a second space platform, said vector conduit adapted to be connected, at one end, in signal receiving relation to the signal generating means and, at the other end, adapted to be connected in signal transmitting relation to the signal receiving means, said vector conduit comprising:

a plurality of substantially rigid sections arranged in series;

wire means adapted to conduct the directional signal generated at the signal generating means to the signal receiving means;

articulating joint means connecting said rigid sections in such a way as to permit relative angular movement therebetween; and electromechanical compensating means operably connected to said joint means and electrically interposed in said wire means whereby relative movement between connected rigid sections is measured by said compensating means and the directional signal is corrected for the measured angular movement between said rigid sections, thereby orienting the signal receiving means into a predetermined space position relative to the signal generating means.

2. The vector conduit of claim 1 wherein said joint means hingedly connected at least two of said rigid sections to permit rotation about a substantially horizontal axis substantially transverse to the longitudinal axis of the connected conduit sections.

3. The vector conduit of claim 2 wherein said joint means hingedly connects at least two of said rigid sections for rotation about a substantially vertical axis substantially transverse to the longitudinal axis of the connected conduit sections.

4. The vector conduit of claim 3 wherein said joint means rotatably connects at least two of said rigid sections in line for rotation about a longitudinal axis.

5. The vector conduit of claim 1 wherein said compensating means comprises a resolver having a shaft rotatably mounted in a housing, the shaft connected to one of said rigid connected section and the housing connected to the other of said rigid connected section whereby relative movement between the connected sections is measured and the directional signal is compensated for the measured movement between the joint sections thereby orienting the signal receiving means into a predetermined space position relative to the signal generating means.

6. The vector conduit of claim 1 wherein at least two of said rigid sections are connected in line by extensible joint means to permit longitudinal movement between said connected rigid section.